United States Patent

Lazorchak

[11] Patent Number: 5,739,605
[45] Date of Patent: Apr. 14, 1998

[54] BI-STABLE CLUTCH

[75] Inventor: Edward D. Lazorchak, Ho-Ho-Kus, N.J.

[73] Assignee: Electroid Co., A Division of Valcor Engineering Corp., Springfield, N.J.

[21] Appl. No.: 780,039

[22] Filed: Dec. 23, 1996

[51] Int. Cl.$^6$ .............................. H02K 7/114; F16D 27/10
[52] U.S. Cl. ........................ 310/78; 310/76; 310/92; 192/113.25; 192/113.26; 192/89; 192/84 C
[58] Field of Search ............................ 310/76, 77, 78, 310/92; 192/113.25, 113.26, 89, 89.26, 56.4, 53.2

[56] References Cited

U.S. PATENT DOCUMENTS

| | | | |
|---|---|---|---|
| 3,662,197 | 5/1972 | Worst | 310/78 |
| 3,760,917 | 9/1973 | Pagdin | 192/84 C |
| 3,865,222 | 2/1975 | Briar | 192/48.2 |
| 4,295,553 | 10/1981 | Sayo et al. | 192/84 C |
| 4,566,574 | 1/1986 | Marshall | 192/84 C |
| 4,602,705 | 7/1986 | Farr et al. | 188/181 A |

*Primary Examiner*—Steven L. Stephan
*Assistant Examiner*—Timothy A. Williams
*Attorney, Agent, or Firm*—Anthony D. Cipollone

[57] ABSTRACT

A bi-stable clutch is introduced comprising an input and output shaft, a hub assembly attached to output shaft, a hub assembly attached to output shaft and operatively associated with a friction ring which rotates with output shaft of the unique bi-stable clutch. The input shaft is connected to a rotor which drives an armature plate to which the rotor is rotatably attached. The rotor and armature plate are forced apart when the clutch is engaged creating an air gap between the two large enough to not be overcome by the permanent magnet field attracting the armature plate due to a force caused by compression coil springs and the armature plate remains in contact with the rotor and the clutch remains engaged without continuous current transmitting torque from the input to the output shaft.

3 Claims, 2 Drawing Sheets

BI-STABLE CLUTCH

BACKGROUND OF THE INVENTION

1. Field of the Invention

The present invention generally involves the field of technology pertaining to a clutch, and more particularly a bi-stable clutch. A clutch is generally defined as any of a number of various mechanical devices which can be operated for coupling two working parts together. In this case, a driven and a drive part. An output shaft of the clutch can be attached to any device to be drive and an input shaft of the clutch can be operatively associated with or connected to any convenient prime mover such as an electric motor, gasoline engine, diesel engine, or the like.

In general, the bi-stable clutch of the instant invention comprises an input and output shaft, a hub assembly attached to the output shaft and operatively associated with friction material in the form of a ring, and wherein the hub and friction ring are a unitary sub-assembly which rotates with the output shaft of the unique bi-stable clutch for purposes to be more fully described below.

Disposed about and operatively associated with the driven or input shaft is a rotor which in turn is operatively associated with an armature plate by means of a plurality of means, such as dowel pins, in turn, the armature plate is in alternate engagement and disengagement with one face of the friction ring for purposes to be more fully described below.

Compression springs provide the force for alternately causing the armature plate to alternately engage and then separate from one face of the friction ring again as will be more fully described below.

A stationary, that is a non-rotating, sub-assembly comprises an inner and outer magnetic pole, a permanent magnet disposed between the inner and outer magnetic poles and a coil assembly all for purposes to be more fully described below.

2. Prior Art

U.S. Pat. No. 2,421,751 deals with friction devices having relatively rotatable faces that are brought in gripping engagement electromagnetically.

U.S. Pat. No. 2,562,788 relates to electromagnetic brakes of the disk type.

U.S. Pat. No. 2,703,378 relates to an improvement in construction of a magnetic friction clutch disclosed in U.S. Pat. No. 2,488,522 so as to facilitate accurate manufacture thereof by high production methods.

U.S. Pat. No. 3,251,444 deals with clutches and brakes in which an axial magnetic pull generated by suitable exciter coils is utilized to cause controlled engagement of the friction clutch members.

U.S. Pat. No. 3,351,162 relates to an electromagnetic braking mechanism for rapidly stopping a movable flat member or rotative disc.

U.S. Pat. No. 3,618,720 deals with a magnetic particle clutch or brake constituted by a stator surrounding a rotor assembly having an input member and an output member which are intercoupled when the stator coil is excited.

U.S. Pat. No. 3,730,317 relates to a new and improved magnetic coupling and more specifically to a magnetic coupling wherein one of the coupling members is formed of a material which is readily magnetized to different polarities to effect a movement of the coupling members between an engaged and disengaged position.

U.S. Pat. No. 5,185,542 introduces a unique electromagnetic brake, which when pulsed with a D.C. current, will latch and hold in either of two extreme positions; on position and off position, without the necessity of a continuous current to maintain either position.

SUMMARY OF THE INVENTION

According to the present invention, a bi-stable clutch is provided between a drive and driven member for alternately and selectively engaging the two members by means of a drive and driven shaft.

An input or driven shaft rotates by means of any convenient prime mover such as an electric motor, gasoline or diesel engine or the like. The driven shaft is connected by any well known means, such as by set screws, to a rotor which rotor in turn drives an armature plate to which the rotor is rotatably attached through a series of dowel pins or the like.

The rotor and armature plate, when the clutch is in an engaged position, are forced apart by means of compression springs thereby creating an air gap between the rotor and armature plate. This large air gap cannot be overcome by the permanent magnet field assembly attracting the armature plate because of the force caused by the compression coil springs and the armature plate remains in contact with the rotor.

Thus, the clutch remains engaged and, without continuous current to the coil, torque is transmitted from the input to the output shaft and the driver shaft drives the driven.

To disengage the clutch and, therefore, disconnect the drive shaft from the driven shaft, a 100 ms DC electrical current is applied across the coil assembly and having the same plurality as the permanent magnet described above. A magnetic field is thereby created which is strong enough to overcome the force created by the compression springs. The armature plate is then caused to be attracted to the rotor.

With the armature plate and rotor in contact, they are held in a cooperative working, functioning relationship since the permanent magnetic field has sufficient force to hold them together without any DC current being applied. An air gap is thus created between the armature plate and friction ring and the hub is thus disengaged from the armature plate, the clutch is disengaged and no torque is transmitted from the drive to driven shafts.

To again engage the two shafts and thus cause rotation of the two shafts, a DC current electrical pulse is again applied to the coil which momentarily again neutralizes the magnetic field created by the permanent magnet thus allowing the compression springs to cause contact between the armature plate, friction ring and the hub thereby causing rotational movement of the two shafts again without continuous current to the coil.

It is therefore an object of the invention to provide a clutch to alternately connect and disconnect a drive and driven shaft.

It is another object of the invention to provide such a clutch which is bi-stable.

It is still a further object of the invention to provide such a bi-stable clutch wherein a friction ring is disposed between an armature plate and driven hub.

It is still a further object of the invention to provide such a bi-stable clutch wherein a DC current electrical pulse is applied to a coil in either the same or opposite polarity as the polarity of a permanent magnet to alternately engage and disengage the clutch without the need for a continuous pulse of electrical DC current.

These and further objects, features and advantages of the invention shall become apparent from the following detailed

DETAILED DESCRIPTION OF THE PREFERRED EMBODIMENT

Figure 1:
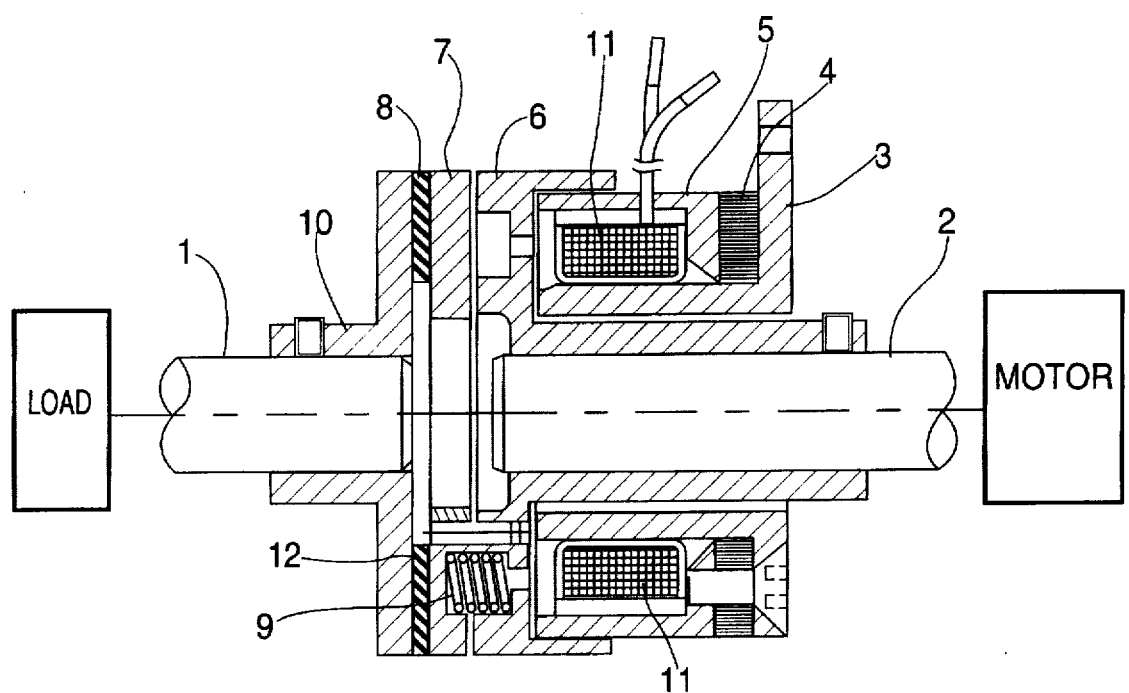
FIG. 1 is a cross-sectional side view of the bi-stable clutch in the engaged position.

A bi-stable clutch using a friction ring disposed between an armature plate and hub will now be described with reference to FIGS. 1 and 2 of the drawings.

An output shaft 1 driving a driven element, not shown, has rotatably connected to it, such as by set screws, a hub 10 which interfaces with one face of a friction ring 8 and the other or second face of which alternately engages and disengages an armature plate 7 thereby alternately engaging and disengaging the bi-stable clutch. The armature plate 7 alternately engages and disengages the second face of friction ring 8 and is rotatably attached to a rotor 6 through one or more dowel pins 12. The rotor 6 in turn is rotatably disposed about an input or driven shaft 2 which is drivably engaged with a prime mover, now shown, by any well known means such as a set screw.

Figure 2:
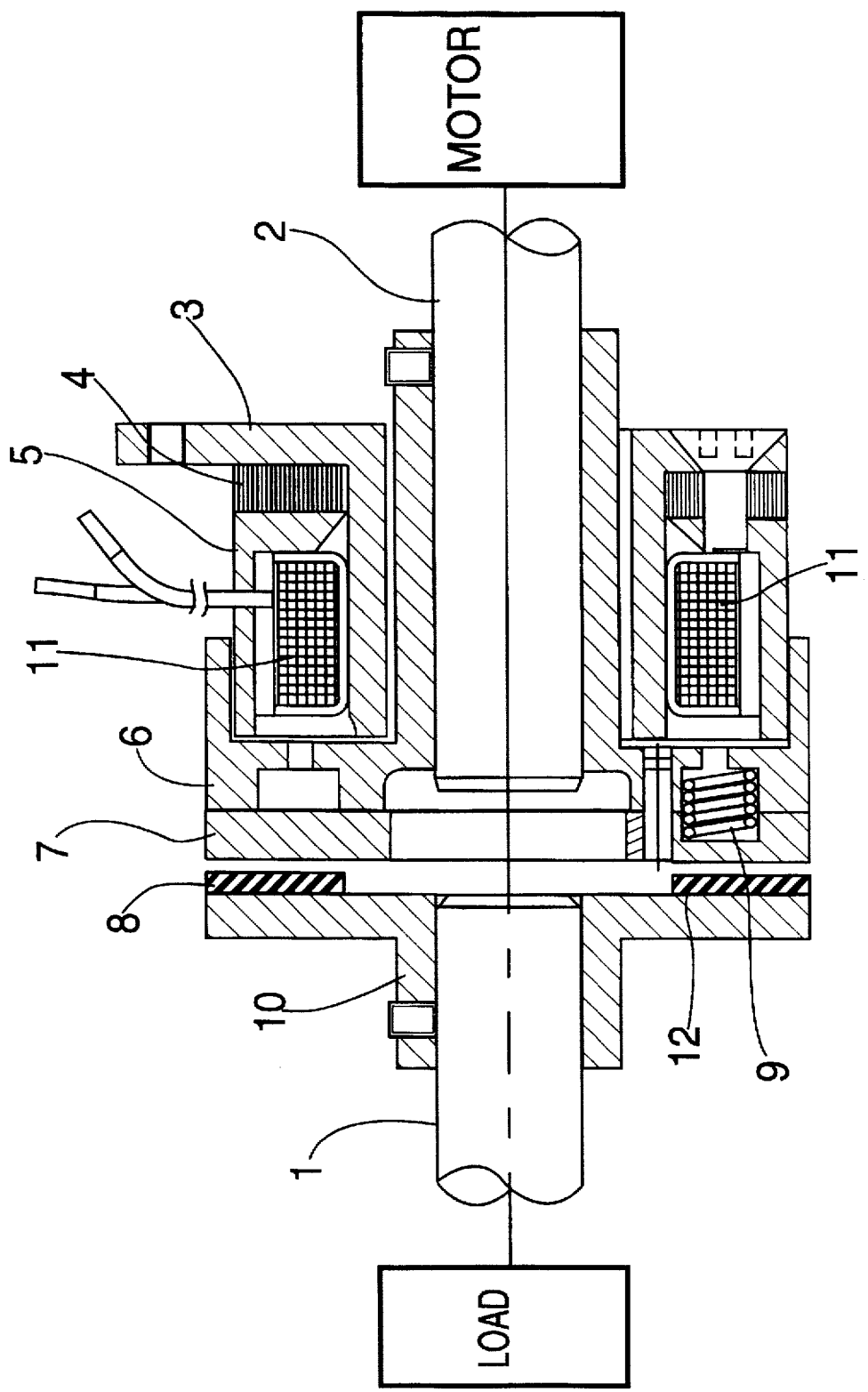
FIG. 2 is a cross-sectional side view of the bi-stable clutch in the disengaged position.

Compression springs 9 are in engagement with the rotor 6 at one end of the spring 9 and with the armature plate 7 at the other end of compression spring 9 which compresses and expands to alternately allow engagement and disengagement of the rotor 6 and armature plate 7 as shown respectively in FIGS. 1 and 2.

A stationary, that is, non-rotating, sub-assembly comprises a coil 11, inner magnetic pole 3, outer magnetic pole 5, and a permanent magnet 4 interposed between the two.

A 100 ms pulse of electrical DC current may be applied to coil 11 having the same polarity, plus or minus, as permanent magnet 4 thereby causing a strong magnetic field which thereby overcomes the force caused by compression springs 9 which therefore causes the armature plate 7 to be magnetically attracted to rotor 6. With the armature plate 7 in contact with rotor 6, the permanent magnetic field is strong enough to cause armature plate 7 and rotor 6 to remain in contact without any further DC electric current applied and an air gap is caused to exist between the armature plate 7 and the one face of friction ring 8 and therefore hub 10 thereby causing the clutch to become disengaged and therefore torque is not transmitted and rotation stops.

To reverse this bi-stable clutch from a disengaged condition to an engaged condition, an electrical DC current pulse is applied to coil 11 in the reverse polarity, to the permanent magnet 4. This DC current pulse momentarily neutralizes the magnetic field created by the permanent magnet 4 which therefore allows the compressions springs 9 to cause the armature plate 7 to again contact the friction ring 8 and hub 10 thereby imparting torque and rotation to the output shaft 1 and to the input shaft 2 without the need of a continuous DC current pulse to the coil 11.

Though the invention has been described and illustrated with reference to a preferred embodiment thereof, those skilled in the art will appreciate that various changes and modifications in shape, size, composition and arrangement of parts may be resorted to without departing from the spirit of the invention or scope of the subjoined claims.

What is claimed is:

1. A bi-stable clutch for alternately engaging and disengaging a drive and driveshaft comprising:

a) an input shaft;

b) an output shaft;

c) a first means for rotating said input shaft which is a prime mover;

d) a second means rotatably connected to said output shaft to be rotatably driven by said output shaft;

e) a third means disposed between said input shaft and said output shaft whereby when said input shaft is rotating said output shaft is caused to rotate or stop rotating depending on whether or not said bi-stable clutch is engaged or disengaged; said third means comprising:

1) a hub rotatably disposed about said output shaft;

2) a friction ring one face of which is rotatably connected to said hub for rotation therewith;

3) a rotor rotatably connected to said input shaft;

4) an armature plate rotatably connected to said rotor and in contact with a second face of said friction ring; and 5) compression springs disposed between said rotor and said armature plate to alternately cause said armature plate to contact and become disengaged from contact with said second face of said friction ring and thereby causing said clutch to alternately become engaged or disengaged depending on whether said compression springs are extended or compressed by DC electrical current means;

said bi-stable clutch further comprising a coil, an inner magnetic pole, an outer magnetic pole, and a permanent magnet disposed between said inner and outer magnetic poles and disposed about said rotor whereby when a pulse of DC current is applied to said coil, having the same polarity as said permanent magnet, a magnetic field is generated thereby overcoming the force caused by said compression springs and thereby causing said armature plate to be magnetically attracted to said rotor and thereby causing said bi-stable clutch to become disengaged.

2. The bi-stable clutch of claim 1 wherein said rotor and said armature plate are connected by means of a plurality of dowel pins.

3. The bi-stable clutch of claim 1 wherein said coil is in magnetic contact with said inner and said outer magnetic poles.

* * * * *